United States Patent Office  
2,722,472  
Patented Nov. 1, 1955

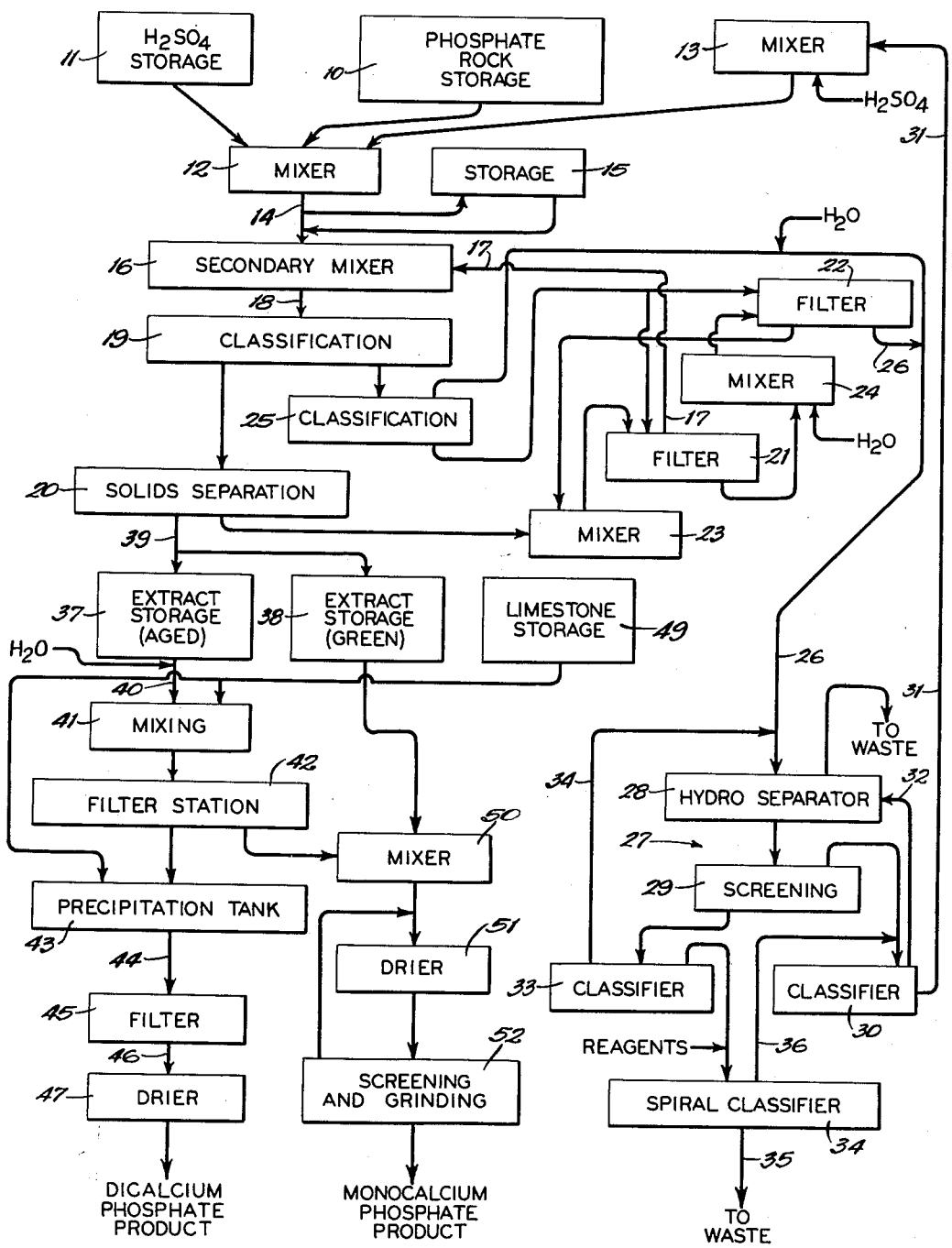

2,722,472

PROCESS FOR PRODUCING PHOSPHATE MATERIALS

Ira M. Le Baron, Evanston, Ill., assignor to International Minerals & Chemical Corporation, a corporation of New York Application October 1, 1952, Serial No. 312,519

14 Claims. (Cl. 23—109)

This invention relates to a process of producing phosphate material for use as, or in, fertilizers, plant food or animal foods. More particularly, it relates to a process for the simultaneous preparation of phosphatic plant foods and fluorine free dicalcium phosphate. Still more particularly it relates to the preparation of a fertilizer or plant food consisting of a mixture of calcium phosphates, predominantly monocalcium phosphate.

In the past a number of processes have been developed for the preparation of calcium phosphate with or without the elimination of fluorine. These processes in general involved the mixing of rock and acid and treatment of the resulting mixture either with heat or chemically to improve the purity or availability of the calcium phosphate products. These processes have all had the disadvantages of being expensive and of producing large quantities of economically useless byproducts.

It is an object of the instant invention to overcome the disadvantages and shortcomings of processes heretofore in use.

It is a further object of the instant invention to prepare an animal food grade phosphate material, predominantly dicalcium phosphate and to utilize the calcium product of the defluorination separation as the precipitating agent for the plant food or fertilizer product.

It is still another object of this invention to prepare a highly available phosphate plant food.

These and other objects of the invention will be apparent to those skilled in the art from the following description:

Briefly, the invention comprises the preparation of extract liquors by leaching aged and green, or unaged, superphosphates separately, and mixing with the aged superphosphates extract sufficient calcium bearing reactant for reduction of fluorine content below about .02 to about .06%, without precipitation of more than a minor amount of dicalcium phosphate, segregating the solid phase material from the defluorination reaction, mixing the solid phase material with the green extract and recovering the phosphatic constituents as a dry predominantly monocalcium phosphate product.

More in detail, the improved process reacts finely divided phosphate rock with sulfuric acid of predetermined dilution. A raw phosphatic rock material comprises essentially tricalcium phosphate or its mineral equivalent; for example, collophane or apatite of either high or low phosphatic content, which content usually falls in the range of approximately 30% to approximately 35% $P_2O_5$. The phosphatic source material is best utilized if it is finely ground, i. e., about 48% to about 80% being capable of passing through a 200 mesh standard screen. Less finely ground material may be used, but the subsequent acidulation requires a considerably longer time to achieve substantial as well as complete conversion. The finely ground material is allowed to react with sulfuric acid under constant and intensive agitation which is of short duration.

The time of mixing is preferably of the order of one to two minutes, which time is sufficient for thorough mixing and at the same time results in the formation of a porous, easily crushed mass of low bulk density. The temperature of the acid fed to the mixer is generally within the range of 65° to about 100° C.

The sulfuric acid mixed with finely ground rock may be of any convenient dilution; for example, about 50% to about 70% sulfuric acid corresponding to 40° to 55° Bé. It will, of course, be understood that under special conditions concentrations of sulfuric acid higher than mentioned can be utilized. This acid is added to the ground phosphate rock in such a proportion that there will be present in the mix between about 101% and about 120% of the sulfuric acid theoretically required to convert all of the $P_2O_5$ present in the rock to monocalcium phosphate, allowing in addition enough acid to also react with the impurities such as iron, alumina, fluorine and the like. The acid is preferably added as about 60% to 69% sulfuric acid. The total quantity of acid need not be added all at the same time as a single addition, but may be partially added originally, and the remainder added during or before the subsequent leaching step. The highest recovery of water-soluble phosphorus values is achieved using about 65% to about 69% sulfuric acid. A maximum recovery is generally obtained using about 66% sulfuric acid with the mix being aged for about 4 to 6 weeks.

The acid mix has been found to set up in about 15 to 20 minutes with a dry mass which remains friable for indefinite periods of time. The solidified mix is conveyed directly to succeeding processing steps as green superphosphate or it is simply stored until such time as required, normally 14 days or more, to produce aged superphosphate.

The acid mix is next subjected to a leaching and then a filtration operation. The acid mix is passed through suitable pulverizing apparatus, such as a hammermill, and the powdered product fed to a mixing tank in predetermined quantities where it is mixed with metered quantities of water or dilute monocalcium phosphate aqueous solution. The leaching operation may be carried out at temperatures in the range of about 72° C. to about 82° C. preferred, in order to reduce the viscosity of the solution and improve filtration, provided the mol ratio of $CaO/P_2O_5$ is below 0.7 to prevent formation of insoluble dicalcium phosphate precipitates.

The leaching operation is preferably carried out by the countercurrent flow of solids and liquids. Sufficient liquid leaching medium is added so that the resulting slurry contains between about 35% and about 40% solids, although more concentrated or more dilute slurries may be employed if desired. The agitation and slurrying is for a short period, of the order of about 5 to about 15 minutes, either while hot or at atmospheric temperatures.

In the countercurrent operation, water or dilute monocalcium phosphate solution first contacts solids which have passed through successive mixing stages and separations to the last mixing stage. After contact with water, for example, the undissolved solids, after passage through the high concentrate filter, are conveyed to storage for further treatment in the initial acid treatment stages of the process. Rich liquor from the first or filter stage contains approximately 30% to approximately 35% dissolved solids, of which approximately 18% to approximately 22% is phosphate measured as $P_2O_5$ values. This solution is of approximately 31° to approximately 34° Bé. The separation of phosphatic solution and insoluble solids may be carried out in any convenient and conventional manner, such as for example, by filtration, countercurrent multistage centrifuging, or by use of liquid phase cyclone separators.

Phosphate solution or extract recovered from the liquid-solid separation forms an aqueous solution ranging in solids content from approximately 20% to approximately 35% by weight of which about 10% to 20% by weight is phosphate ($P_2O_5$). This extract solution comprises essentially monocalcium phosphate and orthophosphoric acid. Solution or extract prepared from aged superphosphate is defluorinated by the addition of a calcium-bearing reactant, such as limestone, preferably a porous chalky calcarenite, such as Ocala limestone, although other materials such as calcium oxide or hydrated or slaked lime may also be used. In such a defluorination operation when the extract contains about 10 to 20% $P_2O_5$, there is added about 4 to 8 parts by weight of, for example, limestone for each 100 parts of solution. In the reaction of limestone with such a solution a solid phase is formed consisting of some unreacted limestone together with precipitated fluorine-bearing material. This solid phase is removed by suitable means as a so-called cake. In the reaction the fluorine content of an extract which will run about 0.3% to about 1% by weight of fluorine depending on the source of phosphate rock, is reduced to a content in the range generally of about .02 to about .06% and preferably to less than .04%.

Defluorinated solution can be processed in various ways. The solution can be evaporated for example in vacuum evaporators and the concentrate spray dried or the solution can be reduced to substantial dryness with or without maintaining a circulating or recycle load of granular material in a rotary kiln. Preferably, however, the phosphatic constituents of the solution are precipitated by the addition of calcium-bearing reactants thereby recovering 98 to 99% of the dissolved $P_2O_5$ content. This low fluorine content dicalcium phosphate may be segregated and dried for shipment as an animal feed supplement.

The cake from the defluorination operation has in it sufficient unreacted calcium to form a precipitate with additional quantities of extract solution. Advantage is taken of this fact by mixing such a cake with extract of approximately the same general character as that which was previously defluorinated. For example, cake is mixed with the extract from green or unaged superphosphate in quantities sufficient to produce a final product which will be predominantly monocalcium phosphate. In general 50 to 100 parts by weight of such a cake will supply reactants for approximately 100 parts by weight of extract having a $P_2O_5$ content in the range of approximately 10 to approximately 20%.

The invention will be better understood from the following description given in connection with the schematic flowsheet:

In the flowsheet the numerals 10 and 11 indicate storage facilities for comminuted phosphate rock and approximately 52° Bé. (67%) sulfuric acid respectively.

Rock is conveyed from storage area 10 to a mixing station 12 and brought into intimate contact with acid piped from suitable facility 11. Particles of +200 mesh size from hte leaching and classification operations subsequently described herein, either directly or after pretreatment with strong sulfuric acid in a mixer 13, are also delivered to the mixing station 12.

Acid mix from station 12 is delivered by conveyor 14 to storage area 15 or directly to a secondary mixing station 16. In station 16 either aged or unaged acid mix is brought into contact with liquid supplied through conduit 17 from a source later described.

Slurry from station 16 is delivered by conduit 18 to a primary classification station 19 where +14 mesh size material is removed. Slurry underflowing the station 19 is delivered to a countercurrent leach-filtration system consisting of filtration stations 20, 21, 22, and mixers 23 and 24.

Oversize material from classifier 19 is conveyed to a second classifier 25 of similar character. Material passed as oversize from classifier 25 is delivered to the conveyor 26 delivering cake from filter 22 to filter cake reclassification operation 27. Underflow slurry from classifier 25 is delivered for filtration to filter 22.

In the countercurrent extraction system water is delivered to a mixer 24 where it is utilized to slurry filter cake from filter 21. Solids are removed from the slurry from mixer 24 in filter 22. The filtrate from filter 22 is utilized to slurry filter cake from filter 20 in mixer 23. Slurry from mixer 23 is filtered in filter 21. Solid cake from filter 21 is delivered to mixer 24. Liquid from filter 21, as explained above, is delivered by conduit 17 to mixer 16. The filtrate from filter 20 is an enriched extract containing the soluble phosphatic constituents of the acid mix.

Cake from filter 22 together with oversize material from classifier 25 is mixed with water and delivered to the secondary reclassification operation 27. The material delivered by the conveyor 26 is mixed with water and passes to a hydroseparator 28. The overflow material from this separator is primarily gypsum and is sent to waste storage. This material delivered to waste storage consists predominantly of gypsum and phosphate solids of −200 mesh standard screen size. The underflow from hydroseparator 28 consisting of the +200 mesh size solids in slurry form may be separated in various ways but preferably is separated by a screening system 29 which divides the underflow into a +24 mesh fraction and a −24 mesh fraction. The +24 mesh fraction which contains a high percentage of unreacted phosphate rock is preferably delivered to an Akins classifier 30 which divides the fraction into two portions, the larger of which is returned by conduit 31 to the mixing tank 13 and the smaller size fraction which is returned to the hydroseparator 28 through conduit 32. The −24 mesh fraction from screens 29 is likewise preferably delivered to an Akins classifier 33. The overflow from classifier 33 is likewise returned by conduit 34 to the hydroseparator 28. The underflow from classifier 33 is mixed with proper reagents and delivered to a spiral classifier 34 which produces a tailing fraction 35 which is sent to waste. The concentrate from spirals 34 is delivered by conduit 36 to the Akins classifier 30 where any unreacted phosphate of sufficiently large size will be trapped and returned to the mixing tank 13.

The extract or filtrate from filter 20 is delivered to storage tanks 37 and 38 through conduit 39, extract storage 37 being for the extract produced from aged superphosphate and the extract storage 38 being for extract from green or unaged superphosphate.

Extract from storage tank 37 is delivered by conduit 40 to a mixing tank 41. Water is added to the extract to adjust the solids content to between 12% and 18% $P_2O_5$ content and then there is added comminuted limestone from storage area 49. From mixing tank 41 the resultant slurry is passed to a filtering station 42 where there is produced a so-called cake consisting predominantly of unreacted limestone and precipitated fluoride complex. The filtrate from filter 42 is heated by suitable means to a temperature in the range of 175° to about 212° F. in precipitation tank 43 and additional quantities of ground limestone or calcium-bearing reactant added from source 49 or secondary source not shown. The product of the reaction in tank 43 is dicalcium phosphate of low fluorine content. Slurry from tank 43 is delivered by conduit 44 to a filter 45 which removes the dicalcium phosphate solids. The solids are delivered by conveyor 46 to a dryer 47 from which is obtained a dry product of approximately 20% phosphorus content or approximately 46% $P_2O_5$ content.

Cake from filter 42 is brought into intimate contact with green extract from storage tank 38 in a mixer 50. The resultant slurry predominantly monocalcium phosphate has the moisture removed therefrom in a dryer 51. Dry solids are screened and ground to produce a −8 +12 mesh solid material useful as fertilizer having approximately 56% available P₂O₅ content. Undersize material from the screening operation 52 is returned to the system by mixing into the wet slurry being delivered to the dryer 51.

*Example*

About 10 tons per hour of Florida phosphate rock was ground to a particle size approximately 52% of which passed through a 200 mesh standard screen. This rock analyzed about 67% bone phosphate of lime. The ground rock was mixed with about 6 tons per hour of about 98% sulfuric acid added as 51° to 54° Bé. aqueous solution. The mixture was thoroughly agitated for about two minutes after which it was discharged onto a continuous belt provided with exhaust means for gases such as sulfur dioxide, silicon tetrafluoride and the like, placed adjacent the point of discharge of slurry onto the belt. The belt length and its speed were such that the mixture remained on the belt about 20 minutes. The discharge from the belt was stored in a pile for about 14 days.

The stored material was then removed from storage, broken up and sufficient water added to give a slurry of about 35% undissolved solids. The slurry was subjected to four steps of continuous countercurrent decantation followed by a single filtration to produce a leach solution containing about 30% dissolved solids being of approximately 32° Bé. gravity. The discarded tailings contained about 2.5% of the 30% total P₂O₅ only about one-half of which is available. This extract was delivered to the storage tank 37.

A second acid mix was prepared utilizing the same proportions, but was not sent to storage. The green or unaged mix was delivered directly to the countercurrent decantation operation to produce a leach solution containing approximately the same percentage of dissolved solids as the extract from the aged superphosphate. This solution was delivered directly to storage tank 38. The extract from aged superphosphate was further processed by adding thereto approximately 6 parts by weight of limestone per 100 parts by weight of extract solution. It will be recognized that other materials capable of reacting in the same molecular proportions may be substituted for limestone such as calcium oxide. The mixing of these proportions of ingredients results in the precipitation of the major portion of the fluoride present in the extract to produce a filtrate having approximately 15% P₂O₅, 0.04% fluorine and a CaO/P₂O₅ ratio of approximately 0.9. To this filtrate is added approximately 12 parts by weight of comminuted limestone per 100 parts of defluorinated extract. The result of the reaction of these ingredients is the precipitation of a material which is predominantly dicalcium phosphate. The dicalcium phosphate solids are filtered off and show a recovery of approximately 99% of the phosphates present in the extract solution. The dicalcium phosphate is dried and the product contains approximately 20% phosphorus.

The filter cake containing the precipitated fluorides was mixed with extract from green superphosphate from storage tank 38 in the proportions of approximately 11 pounds of cake per 100 pounds by weight of green extract solution. The resultant slurry is dried in a rotary kiln and screened to produce a —8 +12 mesh product containing approximately 56% available P₂O₅.

Having thus described my invention what I desire to secure by Letters Patent is:

1. A process for recovering phosphate values which are present in phosphate rock which comprises forming a first and second mix of sulfuric acid and ground phosphate rock, aging said first mix for a period of at least several days, leaching said aged mix with an aqueous medium to produce an aged extract containing water-soluble phosphate values and solid calcium sulfate, separating said aged extract from said calcium sulfate, leaching said second acid mix with an aqueous medium to produce a second extract containing water-soluble phosphate values and solid calcium sulfate, separating said second extract from said calcium sulfate, adding a basic calcium compound selected from the group consisting of calcium carbonate, calcium oxide and hydrated lime to said separated aged extract to precipitate therefrom a solid phase material high in fluorine content, separating said precipitated solid phase material high in fluorine content from the resulting defluorinated aged extract, reacting said separated second extract with said solid phase material high in fluorine content, removing water from the reaction mixture so formed and recovering the phosphate product so produced.

2. The process of claim 1 wherein said first and second mixes are formed by mixing sulfuric acid with phosphate rock in an amount between about 101% and 120% of that theoretically required to convert all of the phosphorus pentoxide present in the rock to monocalcium phosphate and to react with the impurities present in said rock.

3. The process of claim 1 wherein said basic calcium compound is limestone.

4. The process of claim 1 wherein the aqueous medium employed to leach said aged mix of sulfuric acid and phosphate rock and said second mix of sulfuric acid and phosphate rock is an aqueous solution of monocalcium phosphate.

5. The process of claim 2 wherein the aqueous medium employed in leaching said first and second acid mixes is utilized in an amount sufficient to provide aged and second extracts containing after separation of calcium sulfate therefrom about 20% to 35% by weight of solids, of which about 10% to about 20% by weight is phosphorus pentoxide.

6. The process of claim 5 in which about four to eight parts by weight of said basic calcium compound are added for each 100 parts by weight of said separated aged extract.

7. The process of claim 6 wherein 50 to 100 parts by weight of said solid phase material high in fluorine content is utilized for each approximately 100 parts by weight of said separated second extract.

8. A process for utilizing the phosphate values which are present in phosphate rock which comprises forming a first and a second acid mix of sulfuric acid and ground phosphate rock, aging said first acid mix for at least several days, leaching said aged mix with an aqueous medium to produce an aged extract containing water-soluble phosphate values and solid calcium sulfate, separating said aged extract from said calcium sulfate, leaching said second acid mix without substantial aging with an aqueous medium to produce a green extract containing water-soluble phosphate values and solid calcium sulfate, separating said green extract from said calcium sulfate, adding a basic calcium compound selected from the group consisting of calcium carbonate, calcium oxide and hydrated lime to said separated, aged extract to precipitate a solid phase material high in fluorine content therefrom and provide a supernatant liquid containing water-soluble phosphate values in solution, separating said precipitated solid phase material high in fluorine content from said supernatant liquid, reacting said separated green extract with said solid phase material high in fluorine content, removing water from the reaction mixture so formed, and recovering the phosphate product so formed.

9. The process of claim 8 wherein said first and second mixes are formed by mixing sulfuric acid with phosphate rock in an amount between about 101% and 120% of that theoretically required to convert all of the phosphorus pentoxide present in the rock to monocalcium phosphate and to react with the impurities present in said rock.

10. The process of claim 9 wherein the aqueous medium employed in leaching said first and second acid mixes is utilized in an amount sufficient to provide aged and second extracts containing after separation of calcium sulfate therefrom about 20% to 35% by weight of solids, of which about 10% to about 20% by weight is phosphorus pentoxide.

11. The process of claim 10 in which about four to eight parts by weight of said basic calcium compound are added for each 100 parts by weight of said separated aged extract.

12. The process of claim 11 wherein from 50 to 100 parts by weight of said solid phase material high in fluorine content is employed for each 100 parts by weight of said green extract.

13. A process for utilizing the phosphate values which are present in phosphate rock which comprises forming an acid mix of sulfuric acid and ground phosphate rock, substantially aging over a period of at least several days said acid mix, leaching said aged mix with an aqueous medium to produce an aged extract containing water-soluble phosphate values and solid calcium sulfate, separating said calcium sulfate from said aged extract, adding a basic inorganic calcium compound selected from the group consisting of calcium carbonate, calcium oxide and hydrated lime to said aged extract from which said calcium sulfate has been separated to precipitate a solid phase material high in fluorine content therefrom, separating said precipitated solid phase material high in fluorine content from the resulting defluorinated aged extract, reacting said separated solid phase material high in fluorine content with an extract obtained by leaching a ground phosphate rock-sulfuric acid mix, removing water from the reaction mixture so formed and recovering the phosphate product produced.

14. The process of claim 13 wherein said sulfuric acid and ground phosphate rock mix from which said aged extract is derived is formed by mixing sulfuric acid with phosphate rock in an amount between about 101% and 120% of that theoretically required to convert all of the phosphorus pentoxide present in the rock to monocalcium phosphate and to react with the impurities present.

References Cited in the file of this patent

UNITED STATES PATENTS

| | | |
|---|---|---|
| 1,348,495 | James | Aug. 3, 1920 |
| 1,425,747 | Coates | Aug. 15, 1922 |
| 1,849,703 | Boller | Mar. 15, 1932 |
| 2,013,970 | Moore | Sept. 10, 1935 |
| 2,018,449 | Knox | Oct. 22, 1935 |
| 2,115,150 | Seyfried | Apr. 26, 1938 |
| 2,121,208 | Milligan | June 21, 1938 |
| 2,143,025 | Newton | Jan. 10, 1939 |
| 2,176,464 | Merchant | Oct. 17, 1939 |
| 2,514,973 | Robinson | July 11, 1950 |